United States Patent
Månsson (10) Patent No.: US 11,077,458 B2
(45) Date of Patent: Aug. 3, 2021

(54) ARRANGEMENT AT SPRAY NOZZLE CHAMBER

(71) Applicant: BALDWIN JIMEK AB, Arlöv (SE)

(72) Inventor: Patrik Månsson, Höllviken (SE)

(73) Assignee: Baldwin Jimek AB, Arlöv (SE)

( * ) Notice: Subject to any disclaimer, the term of this patent is extended or adjusted under 35 U.S.C. 154(b) by 74 days.

(21) Appl. No.: 16/342,317

(22) PCT Filed: Oct. 6, 2017

(86) PCT No.: PCT/EP2017/075534
§ 371 (c)(1),
(2) Date: Apr. 16, 2019

(87) PCT Pub. No.: WO2018/073025
PCT Pub. Date: Apr. 26, 2018

(65) Prior Publication Data
US 2019/0275546 A1    Sep. 12, 2019

(30) Foreign Application Priority Data

Oct. 19, 2016 (SE) .................................... 1651370-7

(51) Int. Cl.
*B05B 12/16* (2018.01)
*B05B 14/44* (2018.01)
(Continued)

(52) U.S. Cl.
CPC .......... *B05B 13/0207* (2013.01); *B05B 12/16* (2018.02); *B05B 14/44* (2018.02); *B05C 11/021* (2013.01); *B05D 1/02* (2013.01)

(58) Field of Classification Search
CPC ........ B65D 2590/542; B65D 2583/085; B65D 2585/645
(Continued)

(56) References Cited

U.S. PATENT DOCUMENTS

| 375,121 A | 12/1887 | Chappell |
| 541,660 A | 6/1895 | Duffy |

(Continued)

FOREIGN PATENT DOCUMENTS

| AT | 367321 B | 6/1982 |
| CA | 1203375 A | 4/1986 |

(Continued)

OTHER PUBLICATIONS

Swedish Search Report for Serial No. 1651371-5 dated Apr. 27, 2017.

(Continued)

*Primary Examiner* — Alexander M Weddle
(74) *Attorney, Agent, or Firm* — Matthew J. Himich (57) ABSTRACT

A chamber for fluid application to a piece of material (M), such as a web or strip arranged to nm in the chamber (10), has a fluid applicator (2) for fluid application to the material. It further includes an inlet (11*a*) through which the material is fed into the chamber (10), an outlet (11*b*) through which the material exits the chamber (10), an outlet passage device (15) arranged at the outlet (11*b*) and configured to form an outlet fluid sealing of the chamber, and an inlet passage device (16) arranged at the inlet (11*a*) and configured to form an inlet fluid sealing of the chamber.

19 Claims, 5 Drawing Sheets

(51) Int. Cl.
   *B05B 13/02* (2006.01)
   *B05D 1/02* (2006.01)
   *B05C 11/02* (2006.01)

(58) Field of Classification Search
   USPC ......... 220/565, 567, 567.2, 567.3, 570, 571, 220/592.01; 4/538, 553, 640, 650, 680
   See application file for complete search history.

(56) References Cited

U.S. PATENT DOCUMENTS

| | | | |
|---|---|---|---|
| 930,926 A | 8/1909 | Bentley | |
| 1,051,846 A | 1/1913 | Brown | |
| 3,273,805 A | 9/1966 | Hall | |
| 3,447,756 A | 6/1969 | Lawrence, Jr. | |
| 3,776,471 A | 12/1973 | Meyer et al. | |
| 3,814,322 A | 6/1974 | Waldrum | |
| 3,908,408 A * | 9/1975 | Getchell | D06B 1/08 68/5 E |
| 3,930,464 A * | 1/1976 | Wallsten | B05B 14/00 118/122 |
| 3,995,684 A | 12/1976 | Schmid | |
| 4,023,385 A | 5/1977 | Hurd | |
| 4,142,854 A | 3/1979 | Sando et al. | |
| 4,231,318 A * | 11/1980 | Zink | B05C 1/0834 118/122 |
| 4,247,047 A | 1/1981 | Schaming | |
| 4,656,063 A | 4/1987 | Long et al. | |
| 5,316,588 A | 5/1994 | Dyla | |
| 5,342,657 A | 8/1994 | Budjinski et al. | |
| 5,547,129 A | 8/1996 | Fortunato et al. | |
| 6,367,718 B1 | 4/2002 | Lotz | |
| 9,118,013 B2 | 8/2015 | Kaiho | |
| 9,186,881 B2 | 11/2015 | Vinnay et al. | |
| 2003/0108678 A1 | 6/2003 | Wegehaupt | |
| 2007/0125886 A1 | 6/2007 | Zillig et al. | |
| 2008/0014361 A1 | 1/2008 | Johannessen | |
| 2009/0282621 A1 | 11/2009 | Kennedy et al. | |
| 2011/0189402 A1 | 8/2011 | Wagner | |
| 2012/0111431 A1 * | 5/2012 | Singh | E03B 11/02 137/565.01 |
| 2015/0375247 A1 | 12/2015 | Funseth et al. | |
| 2019/0283047 A1 | 9/2019 | Månsson et al. | |
| 2020/0122165 A1 | 4/2020 | Choi et al. | |

FOREIGN PATENT DOCUMENTS

| | | |
|---|---|---|
| CA | 2084637 C | 9/2002 |
| CN | 1060044 A | 4/1992 |
| CN | 105142801 A | 12/2015 |
| DE | 1796280 A1 | 11/1972 |
| DE | 2711428 A1 | 9/1977 |
| DE | 3014542 A1 | 10/1981 |
| DE | 19646568 A1 | 5/1998 |
| EP | 0006763 A2 | 1/1980 |
| EP | 0060375 A2 | 9/1982 |
| EP | 0323316 A2 | 7/1989 |
| EP | 1413430 B1 | 6/2005 |
| EP | 2789397 A1 | 10/2014 |
| EP | 3069794 A1 | 9/2016 |
| GB | 1306897 A | 2/1973 |
| GB | 1426442 A | 2/1976 |
| GB | 1474087 A | 5/1977 |
| GB | 2326609 A | 12/1998 |
| GB | 2326609 B | 1/2001 |
| GB | 2337984 B | 7/2003 |
| JP | S58128137 A | 7/1983 |
| JP | 3285384 B2 | 5/2002 |
| WO | 2013002704 A1 | 1/2013 |
| WO | 2013158458 A2 | 10/2013 |
| WO | 2016162048 A1 | 10/2016 |
| WO | 2018073026 A1 | 4/2018 |

OTHER PUBLICATIONS

Swedish Search Report for Serial No. 1651370-7 dated Apr. 27, 2017.
International Search Report and Written Opinion for PCT/EP2017/075534 dated Dec. 13, 2017.
International Search Report and Written Opinion for PCT/EP2017/075535 dated Dec. 8, 2017.

* cited by examiner

ARRANGEMENT AT SPRAY NOZZLE CHAMBER

CROSS-REFERENCE TO RELATED APPLICATIONS

This application is a national stage application of International Patent Application No. PCT/EP2017/075534, filed on Oct. 6, 2017, which claims the benefit of Swedish Patent Application No. 1651370-7 filed on Oct. 19, 2016, both of which are incorporated herein by reference in their entireties.

TECHNICAL FIELD

The present invention relates to a chamber for a spraying arrangement and a method for applying fluid to e.g. a piece of material such as a web or strip.

BACKGROUND

In production sites, manufacturing materials such as textile, paper, wood, plastic and other, different types of fluids and chemicals are used to treat the material in order to obtain different qualities. Oftentimes, a web of the material runs through different stations in a process. The fluids and chemicals are applied to the web in different ways. A common way is to spray, bathe or use rotating discs to apply fluids to a surface, where the fluid in turn provides the material with a desired quality. The quality may be to make the material softer, or dirt-repellent, water-repellent, flame proof, adhesives or similar. All these fluids and chemicals can create a fog, drop or spread and expose operators to danger during the application process. Therefore it is desirable to control the fluid even after it has been, for example, sprayed on the material in order to reduce the risk of exposing operators to possible toxic substances. In particular, the problem of creation of fog during the process has been difficult to solve.

EP1413430B1 describes an example of a plant for coating and laminating a textile with several different application stations. One such station is a spray station. A problem with this known plant is that remaining fluid, or whatever is sprayed onto the textile, after the application process is not taken care of in a controlled way. Toxic substances may therefore "escape" and affect staff in a non desired way.

Further background art is reflected in U.S. Pat. No. 3,908,408A1.

SUMMARY

An object of the present invention is to provide improvements over prior art. This object is achieved by a technique defined in the appended independent claims; certain embodiments being set forth in the related dependent claims.

In one aspect, there is provided a chamber for fluid application to a piece of material such as a web or strip, arranged to run through the chamber. The chamber includes a fluid applicator for fluid application to the material. It further includes an inlet through which the material is fed into the chamber, an outlet through which the material exits the chamber, an outlet passage device arranged at the outlet and configured to form an outlet fluid sealing of the chamber, and an inlet passage device arranged at the inlet and configured to form an inlet fluid sealing of the chamber. This provides a space with a tight sealing where fluid may be applied to the piece of material without letting chemicals and substances of that fluid exit the chamber. Since these chemicals and substances may be toxic to people, it is of most importance that an operator is not exposed to such chemicals and substances.

Preferably, the inlet passage device and/or outlet passage device is/are further configured to collect residual fluid applied to the material by the fluid applicator.

In an embodiment, the outlet and inlet passage devices are shaped in such a way that the material passes through the devices.

Further, the outlet and inlet passage devices may comprise at least one elongated sealing lip which preferably is flexible and which is configured to abut against the material in order to form a fluid sealing between the material and the chamber. This is advantageous since the flexible lip easily adapts to different thicknesses of the material and possible edges and seams in the material and still achieves the desired sealing result.

Yet further, the outlet passage device may comprise a first and a second sealing lip arranged opposite each other of the outlet and configured to form the outlet fluid sealing between the two sealing lips or between the chamber and the material. The first and second lip form a close sealing even if there is no material present, i.e. the chamber may receive different widths of the material without changing its sealing ability. Preferably, the two sealing lips are flexible.

In an embodiment, the inlet passage device comprises a first and a second flexible sealing lip arranged opposite each other of the inlet in order to form the inlet fluid sealing between the two sealing lips or between the chamber and the material. This is beneficial since it results in an even better sealing and application control around the inlet as well.

In another embodiment, the chamber further comprises at least one drain configured to collect and dispose residual fluid. This is advantageous since it also provides a desired handling of the residual fluid making it possible to re-use the fluid.

Further, the inlet passage device may be shaped to lead or direct residual fluid along at least one inner surface of the chamber towards the at least one drain. The at least one inner surface may have an inclination between 20° and 85° in relation to an axis perpendicular to the direction in which the material runs through the chamber.

The chamber may comprise two fluid collecting profiles arranged on a first and a second side wall of the chamber, one on each side of the outlet, wherein the profiles are configured to lead residual fluid towards the drains. The outlet passage device may also be configured to lead residual fluid along at least one inner surface of the chamber towards the two fluid collecting profiles, where the at least one inner surface may have an inclination between 20° and 85° in relation to an axis perpendicular to a direction in which the material runs through the chamber. To have an inclination of at least 20° prevents different types of fluid from dripping at the top of the chamber during its way down to the drains. Dripping is not desired.

In a preferred embodiment, the chamber comprises two drains arranged in the bottom of the chamber, one on each side of the inlet. Further the chamber may include two fluid collecting profiles arranged on a first and a second side wall of the chamber, one on each side of the outlet where the profiles are configured to lead residual fluid towards the drains. The fluid may be collected in several different places in the chamber which means that residual fluid quickly can be collected and disposed.

Preferably, the fluid applicator is a spray applicator for contactless application of fluids.

The web of material is preferably run in a substantially vertical direction through the chamber.

In an embodiment, the chamber is divided into a first and a second chamber portion, separated by the inlet and outlet. This makes it easy for operators to for example perform maintenance work or to change material.

In a further aspect, there is provided a chamber comprising an applicator configured to apply fluid to a piece of material, such as a web or strip, running through the chamber between a chamber inlet and a chamber outlet. The chamber comprises means which are arranged at the outlet and the inlet and which are configured to seal the chamber such that residual fluid or fog resulting from the fluid application cannot leave the chamber. The fluid applicator may comprise a number of spray nozzles configured to spray fluid on to the material running in the spray chamber. The means at the outlet may comprise two opposite elongate sealing lips which define a gap in which the material runs. These sealing lips abut the material on either side of the gap and may serve in particular to seal the chamber. Preferably, the two sealing lips are inclined in such way that the distance between them decreases in the feeding direction of the material.

In another aspect of the invention there is provided a spraying unit having a chamber of the type defined above.

In yet another aspect of the invention there is provided a method for applying a fluid to a piece of material such as a web or strip, running through a spraying unit described above. The method comprising the steps of:

forming a fluid sealing between the material and the chamber by means of at least one passage device arranged at the outlet of the chamber and at least one passage device arranged at the inlet of the chamber; and applying fluid to at least one side of the material by means of a fluid applicator, arranged within the chamber.

In an embodiment, the method further includes the step of:

collecting residual fluid by means of at least one drain and/or at least one fluid collecting profile arranged within the chamber.

In another embodiment, the step of forming a fluid sealing is performed by means of at least one elongated, flexible sealing lip provided at said at least one passage device.

In yet another embodiment, the step of applying fluid involves contactless applying of fluid, for example spraying or by rotating discs.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION OF EMBODIMENTS

With reference to the drawings an enclosure or a spray chamber 10 of a spraying arrangement or spray unit 1 for fluid application to a piece of material M, such as a web or strip, is presented. The spraying arrangement 1 is preferably a station of a fabric manufacturing process (not shown) where a web of fabric runs through each station of the process. The manufacturing process relates in this embodiment to a fabric material but it may in other embodiments relate to other types of material, such as paper, wood, metal, plastic or other types. The fluid to be sprayed can provide the material with different qualities, such as dirt-repellant, water-repellant, flame proof, or making the material softer or adding a desired adhesive.

The elongated chamber 10, which has a substantially hexagonal outer shape, seen from the side, surrounds a fluid applicator 2 for contactless fluid application to a surface of the web M. The fluid applicator 2 has a number of spray nozzles 3, a number of valves (not shown), a fluid feeding device (not shown) and a control unit (not shown), where the control unit controls the feeding device such that it provides the desired amount of fluid to the valves and spray nozzles 3. It also controls the spray pattern and how the spray nozzles 3 cooperate in order to obtain the desired result of the spraying process.

The web M runs in a substantially vertical direction V through the chamber 10 and the spraying arrangement 1. Further, there is provided an inlet 11a, through which the web of web M enters the chamber 10, and an outlet 11b, through which the web M exits the chamber 10. The inlet 11a and outlet 11b divide the chamber 10 into two, in this embodiment, identical or at least similar chamber portions or halves 12, 13 on either side of a vertical axis VA. Each chamber portion 12, 13 has a number of spray nozzles 3 horizontally arranged side by side on a side wall 12a, 13a. By having spray nozzles 3 on each chamber portion 12, 13 an operator may choose to spray one or both sides of the web M. The inlet 11a and outlet 11b extend horizontally, substantially along the width W1 of the chamber 10 creating a passage suitable for different widths W2 of the web M.

Figure 1:
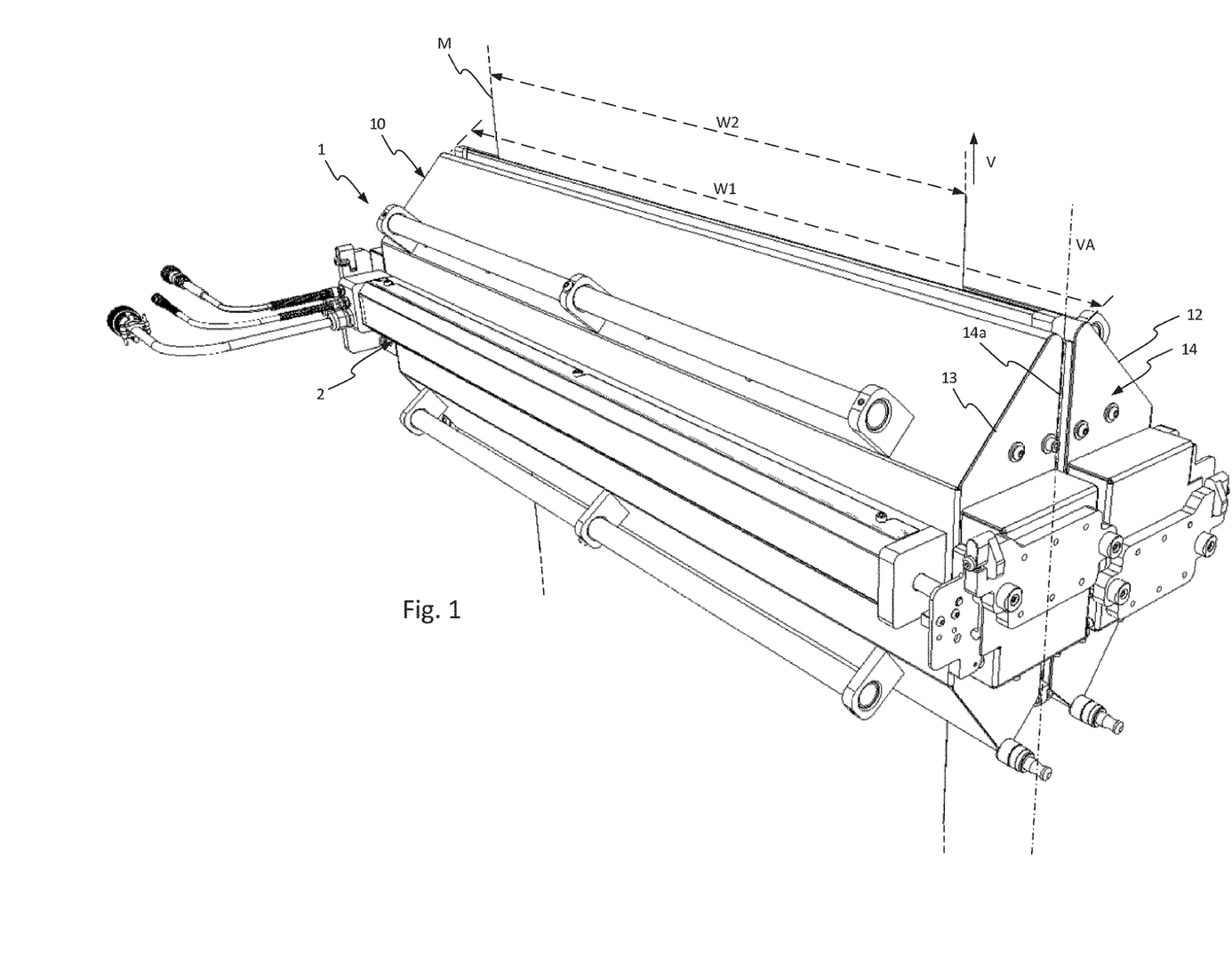
FIG. 1 is a perspective view of a spray unit with a spray nozzle chamber according to an embodiment of the present invention.
Figure 2:
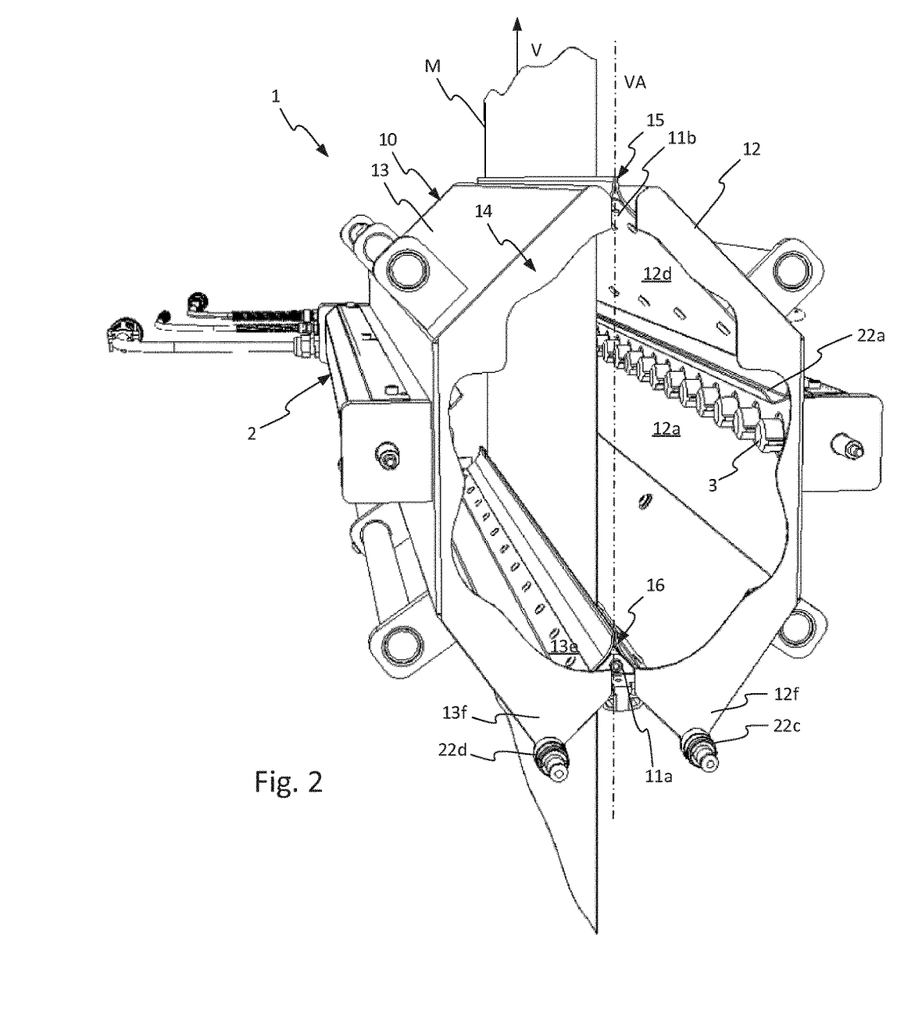
FIG. 2 is a perspective view of the inside of the spray unit in FIG. 1 with certain portions cut away.
Figure 3:
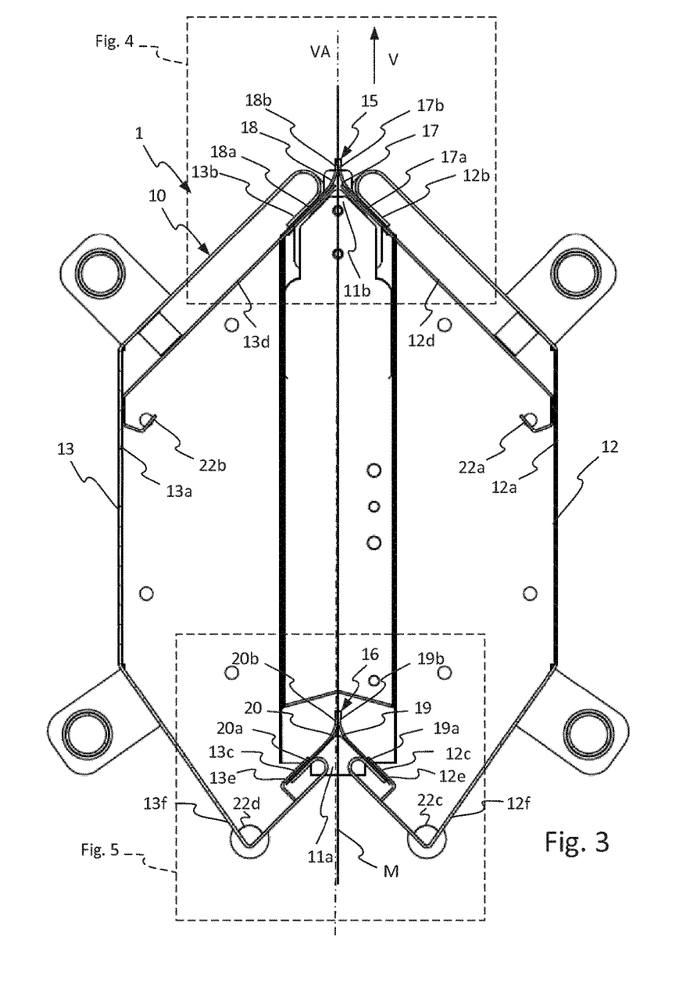
FIG. 3 is a side cross section of the spray unit in FIG. 1.
Figure 4:
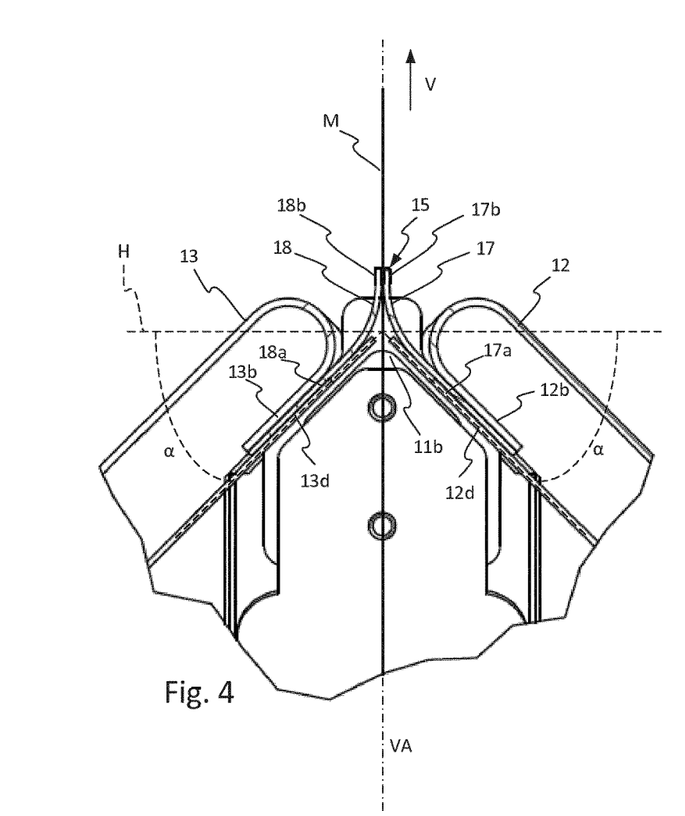
FIG. 4 is a partial cross section of the top of the spray unit.
Figure 5:
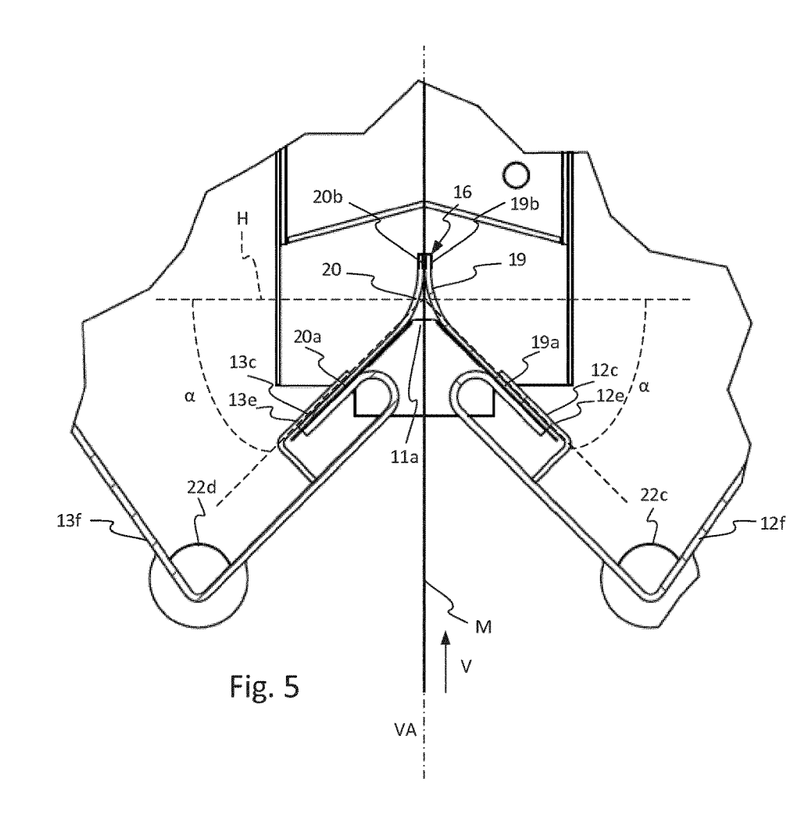
FIG. 5 is a partial cross section of the bottom of the spray unit.

The chamber 10 has two end pieces or gables 14, one on each side of the elongated extension W1 of the chamber 10. Each gable 14 has two parts separated by the two chamber portions 12, 13. In order to make sure that no fluid can exit through the gables 14 of the chamber 10 during a fluid application process there is provided a gable sealing 14a between the two chamber portions 12, 13 at each end. The sealing 14a may preferably consist of two mouldings (not shown) arranged one on each chamber portion 12, 13 such that they abut each other when the chamber portions 12, 13 are brought together, i.e. are in an assembled state, see FIG. 1.

Further, the chamber 10 is provided with an outlet passage device 15 arranged at the outlet 11b. The outlet passage device 15 is configured to collect residual fluid applied on the web M by the spray nozzles 3 of the fluid applicator 2. Furthermore, there is an inlet passage device 16 which is arranged at the inlet 11a and which is also configured to collect residual fluid applied on the web M by the spray nozzles 3 of the fluid applicator 2. The outlet passage device 15 may be configured to collect residual fluid by wiping or scraping it off from the web M, and the inlet passage device 16 may collect fluid raining down from above. Both passage devices 15, 16 are arranged in such way that they form a fluid sealing between the chamber 10 and the web M, in order to prevent fluid or fog from exiting the chamber 10.

The outlet and inlet passage device 15, 16 are shaped in such way that the web M is allowed to pass through the devices 15, 16, i.e. each passage device 15, 16 forms a passage through which the web M can run.

Each passage device 15, 16 includes two, in this embodiment identical or at least similar, passage elements 17, 18, 19, 20, from now on called the first and second passage element 17, 18, 19, 20 of each passage device 15, 16. The first passage element 17 of the outlet passage device 15 is—by an end section 17a-mounted to a top part 12b of the first chamber portion 12, and the second passage element 18 is—by an end section 18a-mounted to a top part 13b of the second chamber portion 13. Hence, the first passage element 17 and the second passage element 18 of the outlet passage device 15 are located on each side of the outlet 11b, opposite each other. The first passage element 19 of the inlet passage device 16 is in turn—by an end section 19a-mounted to a bottom part 12c of the first chamber portion 12, and the second passage element 20 is—by an end section 20a-mounted to a bottom part 13c of the second chamber portion 13. Hence, the first passage element 19 and the second passage element 20 of the inlet passage device 16 are located on each side of the inlet 11a, opposite each other. Each passage element 17, 18, 19, 20 preferably extends along the entire extension of the outlet 11b2 and inlet 11a, respectively. The mounting of each passage element 17, 18, 19, 20 to the chamber portion 12, 13 is for example made by bolts, glue or by any other known method.

The first and second passage element 17, 18, 19, 20 of each passage device 15, 16 has at least one elongated sealing lip 17b, 18b, 19b, 20b, configured to abut against the web M and to possibly wipe or scrape off residual fluid from the surface of the web M. The lips 17b, 18b, 19b, 20b are preferably flexible but they may also be rigid or semi-rigid. The flexible sealing lips may be made of any material such as plastic, metal or rubber but is in this embodiment preferably made of a rubber material.

In the shown embodiment, the first and second passage element 17, 18 of the outlet passage device 15 each includes a flexible sealing lip 17b, 18b, integral with respective end section 17a, 18a mounted to the top parts 12b, 13b of the chamber portions 12, 13. In the same way, the first and second passage element 19, 20 of the inlet passage device 16 each includes a flexible sealing lip 19b, 20b, integral with respective end section 19a, 20a mounted to the bottom part 12c, 13c of the chamber portions 12, 13. Each flexible sealing lip 17b, 18b of the outlet passage device 15 is arranged opposite each other of the outlet 12 in order to foremost form a sealing between the chamber 10 and the web M, and if necessary to be able to wipe or scrape off residual fluid on both sides of the web M. The flexible sealing lips 19b, 20b of the inlet passage device 16 are arranged opposite each other of the inlet 11, in the same way as the first and second flexible sealing lip 17b, 18b of the outlet 12, to form a sealing between the chamber 10 and the web M.

The flexible sealing lips 17b, 18b of at least the outlet passage device 15 are configured to abut against the web of material M and to possibly wipe off the residual fluid after the fluid has been applied to the web M by the applicator 2. Thanks to the flexibility of all sealing lips 17b, 18b, 19b, 20b they are able to adjust to different types of material, different thicknesses and to possible joints or seams in the material.

The sealing lips 17b, 18b, 19b, 20b are configured to seal the chamber 10 even where there is no material M present. Thus, the sealing ability is not affected by the width W2 of the material M in order to make sure that possibly no fluid leaks out of the chamber 10.

The chamber 10 further includes at least one elongated fluid collecting profile 22a, 22b, and one drain 22c, 22d in which residual fluid may be collected and disposed. The outlet passage device 15, in the top of the chamber 10, is designed to lead or direct residual fluid along at least one inner surface 12d, 13d of the top part 12b, 13b of each chamber portion 12, 13, towards the fluid collecting profiles 22a, 22b. In a similar way, the inlet passage device 16 in the chamber 10 is shaped to lead or direct residual fluid along at least one inner surface 12e, 13e of the bottom part 12c, 13c of each chamber portion 12, 13, towards the at least one drain 22c, 22d. The inner surfaces 12d, 13d, 12e, 13e, and preferably also the entire top and bottom part 12b, 13b, 12c, 13c, have an inclination α of at least 20°, preferably between 20° and 85°, in relation to an axis H perpendicular to the feeding direction V in which the web M runs.

In the described embodiment there are two fluid collecting profiles 22a, 22b and two drains 22c, 22d. A first profile 22a is arranged on the side wall 12a and a first drain 22c is arranged in the bottom 12f of the first chamber portion 12. The second profile and second drain 22b, 22d is in a similar way arranged on the side wall 13a and in the bottom 13f of the second chamber portion 13. The two fluid collecting profiles 22a, 22b are located opposite each other on each side wall 12a, 13a and the two drains 22c, 22d opposite each other in each bottom 12f, 13f.

The outlet passage device 15 leads or directs residual fluid from the web M, via its flexible sealing lips 17b, 18b, towards the inner surfaces 12d, 13d of the top parts 12b, 13b, and towards the first and second profile 22a, 22b on the side walls 12a, 13a. In a similar way, the second passage device 16 leads residual fluid, towards the first and second drain 22c, 22d in the bottom 12f, 13f. The fluid collecting profiles 22a, 22b then lead the fluid down towards the drains 22b, 22c which in turn effectively lead the fluid out from the chamber 10 to a fluid container (not shown), located outside the chamber 10.

Figure 6:
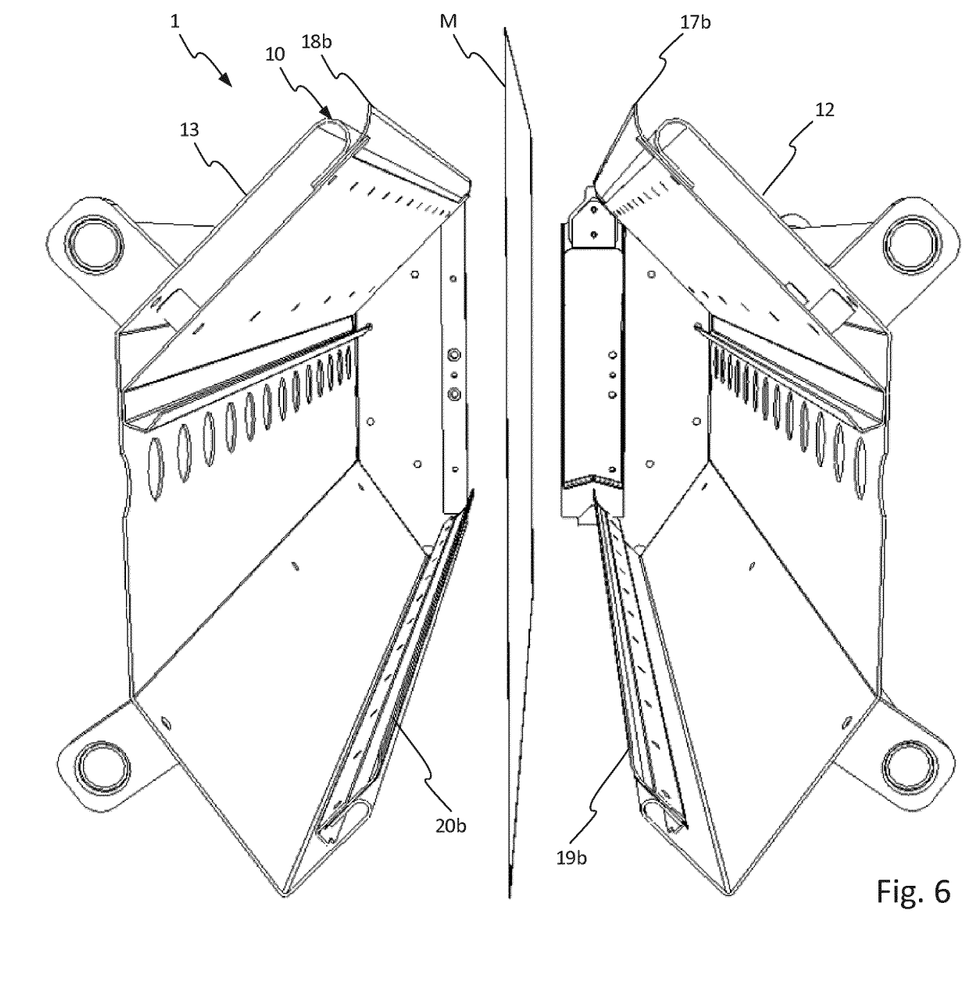
FIG. 6 is a perspective view of the inside of the spray unit with certain portions cut away in a pre-spraying state.

FIG. 6 shows the chamber 10 (without spray nozzles) in a pre-spraying state where the two chamber portions 12, 13 are separated. Before starting the spraying process, the chamber portions 12, 13 are separated to make it easy for operators to place the web of material M in between the two portions 12, 13 where it runs. The chamber portions 12, 13 are then brought back together to form the chamber 10 as described above. The elongated sealing lips 17b, 18b, 19b, 20b form together the inlet and the outlet fluid sealing such that no fluid or fog may leave the inner space of the chamber 10 during the spraying process. This is advantageous since such fluids may contain toxic substances which can be hazardous to operators. After the spraying is completed and the residual fluid has been collected the chamber portions 12, 13 may again be separated in order to remove the web M or to perform necessary maintenance work. The two chamber portions 12, 13 may be separated by for example pulling them apart or by rotating each portion 12, 13 outwards and then downwards, whichever is desired.

The chamber 10 defines a sealed space which prevents or at least reduces the risk that undesired spray fog exits for the chamber 10. Further, the chamber is not bound to a spraying process but can easily be used for other types of fluid applications processes such as bathing or rotating discs.

In another aspect there is provided a method for applying a fluid to a web of material M running substantially vertical through the chamber 10. The method includes the steps:
    forming a fluid sealing between the web M and the chamber 10 by means of at least one passage device 15 arranged at the outlet of the chamber 10 and at least one passage device 16 arranged at the inlet of the chamber 10;

applying fluid to at least one side of the web M by means of a fluid applicator 2 arranged at least partly within the chamber 10; and collecting residual fluid by means of the at least one passage devices 15 arranged at the outlet 12 of the chamber 10. Further, the step of applying fluid is a contactless applying of fluid, for example spraying or by rotating discs and yet further, the step of sealing the chamber 10 is made by means of a flexible sealing lip 17*b*, 18*b*, 19*b*, 20*b* of the at least one passage device 15, 16.

In an aspect there is provided an arrangement for spraying a fluid to a piece of material, such as a web or strip, having a chamber through which the material runs, and a number of valves arranged within the chamber. The valves are configured to spray fluid on the material, where each valve has a spray nozzle and where each spray nozzle includes an elongated opening extending along an axis. At least two of the valves are arranged spaced on a common axis running through a center point of each valve, where the axis of the opening is inclined in relation to said common axis (not shown). An inclined spray pattern which the inclined nozzles are creating can have many advantages to a spray result. For example, it provides a more even spray result of the entire material even if one or more nozzles stop working.

Finally, although the inventive concept has been described above with reference to specific embodiments, it is not intended to be limited to the specific form set forth herein. Rather, the invention is limited only by the accompanying claims and other embodiments than the specific above equally possible within the scope of these appended claims.

The invention claimed is:

1. A chamber for fluid application to a piece of material arranged to run through said chamber, the chamber defining an enclosure with an interior, the chamber comprising
    a fluid applicator for fluid application to said material,
    an inlet through which the material is fed into said chamber,
    an outlet through which the material exits said chamber, and
    an outlet passage device arranged at said outlet, the outlet passage device being adapted and configured to form a seal at the outlet sufficient to seal fluid within the enclosure of the interior at the outlet of said chamber;
    an inlet passage device arranged at said inlet, the inlet passage device being adapted and configured to form a seal at the inlet sufficient to seal fluid within the enclosure of the interior at the inlet of said chamber; and
    at least one drain configured to collect and dispose residual fluid;
    wherein said inlet passage device is configured to lead residual fluid along at least one inner surface of said chamber towards said at least one drain; and
    wherein said at least one inner surface has an inclination between 20° and 85° in relation to an axis perpendicular to a direction in which the material runs through the chamber.

2. The chamber according to claim 1, wherein said inlet passage device and/or outlet passage device is/are further configured to collect residual fluid applied to the material by the fluid applicator.

3. The chamber according to claim 1, wherein said outlet and inlet passage devices are shaped in such way that the material passes through said devices.

4. The chamber according to claim 1, wherein said outlet and inlet passage devices comprise at least one elongated sealing lip configured to abut against the material in order to form a fluid sealing between said material and said chamber.

5. The chamber according to claim 4, wherein said at least one sealing lip is flexible.

6. The chamber according to claim 4, wherein said outlet passage device comprises a first and a second sealing lip arranged opposite each other of the outlet to form the outlet fluid sealing between the two sealing lips or between said chamber and said material.

7. The chamber according to claim 4, wherein said inlet passage device comprises a first and a second sealing lip arranged opposite each other of the inlet in order to form the inlet sealing between the two sealing lips or between said chamber and said material.

8. The chamber according to claim 1, wherein said at least one drain comprises two drains arranged at the bottom of said chamber, one on each side of said inlet, wherein said chamber further comprises two fluid collecting profiles arranged on a first and a second side wall of the chamber, one on each side of said outlet, wherein said profiles are configured to lead residual fluid towards said drains.

9. The chamber according to claim 8, wherein said outlet passage device is configured to lead residual fluid along at least one inner surface of said chamber towards said two fluid collecting profiles.

10. The chamber according to claim 1, wherein the fluid applicator is a spray applicator for contactless application of fluids.

11. The chamber of claim 10, wherein the spray applicator comprises a plurality of spray nozzles arranged in the interior of the enclosure of the chamber on an axis extending perpendicular to a direction of travel of the piece of material from the inlet to the outlet.

12. The chamber according to claim 1, wherein the material runs in a substantially vertical direction through said chamber.

13. The chamber according to claim 1, wherein said chamber is defined by a first and a second chamber portion separated by said inlet and outlet.

14. A spray unit comprising a chamber as claimed in claim 1.

15. The chamber according to claim 1, wherein said piece of material is a web or strip.

16. A chamber comprising an applicator configured to apply fluid to a piece of material running through the chamber between a chamber inlet and a chamber outlet, the chamber defining an enclosure with an interior, said chamber further comprising means which are arranged at the outlet and the inlet and which are configured to seal the interior of the enclosure at the inlet and outlet of the chamber to contain within the interior of the enclosure at the inlet and outlet of the chamber a residual fog or a residual fluid from the fluid applied to the material, said sealing means being adapted and configured to direct the residual fluid or the residual fog from the fluid applied to the material within the interior of the enclosure of the chamber to a drain located in the interior of the chamber.

17. The chamber of claim 16, wherein the applicator comprises a spray applicator with a plurality of spray nozzles arranged in the interior of the enclosure of the chamber, the plurality of spray nozzles being arranged on an axis extending perpendicular to a direction of travel of the piece of material from the inlet to the outlet.

18. A spray unit comprising a chamber as claimed in claim 16.

19. The chamber according to claim 16, wherein said piece of material is a web or strip.

* * * * *